(12) United States Patent
Kumada et al.

(10) Patent No.: US 6,588,274 B1
(45) Date of Patent: Jul. 8, 2003

(54) SELF-DIAGNOSING CIRCUIT FOR VIBRATING GYROSCOPE

(75) Inventors: Akira Kumada, Otsu (JP); Akira Mori, Nagaokakyo (JP); Kazuhiro Ebara, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 46 days.

(21) Appl. No.: 09/697,412

(22) Filed: Oct. 26, 2000

(30) Foreign Application Priority Data

Oct. 29, 1999 (JP) ............................................ 11-308700

(51) Int. Cl.⁷ .................................................. G01P 9/00
(52) U.S. Cl. ...................................... 73/504.02; 73/1.77
(58) Field of Search ......................... 73/504.02, 504.12, 73/504.16, 1.37, 1.38, 514.02, 514.16, 504.04, 504.03, 1.77, 1.79, 1.82

(56) References Cited

U.S. PATENT DOCUMENTS

| | | | | |
|---|---|---|---|---|
| 5,420,548 A | * | 5/1995 | Nakajima | 73/505 |
| 5,696,420 A | * | 12/1997 | Inanaga et al. | 310/316.01 |
| 5,927,143 A | * | 7/1999 | Cho et al. | 73/514.36 |
| 5,970,793 A | * | 10/1999 | Nakajima | 73/504.16 |
| 6,049,157 A | * | 4/2000 | Kobayashi | 310/316.01 |
| 6,089,091 A | * | 7/2000 | Nozoe et al. | 73/504.16 |
| 6,101,878 A | * | 8/2000 | Watari | 73/504.16 |
| 6,167,744 B1 | * | 1/2001 | Akimoto et al. | 73/1.37 |
| 6,205,857 B1 | * | 3/2001 | Nakajima | 73/504.16 |
| 6,220,094 B1 | * | 4/2001 | Ichinose et al. | 73/504.16 |
| 6,244,095 B1 | * | 6/2001 | Nozoe et al. | 73/1.82 |
| 6,253,613 B1 | * | 7/2001 | Yachi et al. | 73/504.16 |
| 6,282,957 B1 | * | 9/2001 | Akimoto et al. | 73/504.12 |
| 6,288,474 B1 | * | 9/2001 | Ono et al. | 310/319 |
| 6,418,790 B1 | * | 7/2002 | Yukawa et al. | 73/504.12 |

FOREIGN PATENT DOCUMENTS

| | | |
|---|---|---|
| JP | 4215017 | 8/1992 |
| JP | 5264279 | 10/1993 |
| JP | 618270 | 1/1994 |

* cited by examiner

Primary Examiner—Daniel S. Larkin
Assistant Examiner—Jacques Saint-Surin
(74) Attorney, Agent, or Firm—Keating & Bennett, LLP

(57) ABSTRACT

A self-diagnosing circuit for a vibrating gyroscope for detecting a vibration due to a Coriolis force including a differential operating circuit for determining a difference between output signals outputted from a plurality of detecting electrodes which provided on the vibrator to detect the vibration due to the Coriolis force; and an offset signal source for superposing an offset signal on at least one of the signals outputted from said plurality of detecting electrodes such that the signals are offset with different signal levels.

21 Claims, 8 Drawing Sheets

FIG.8
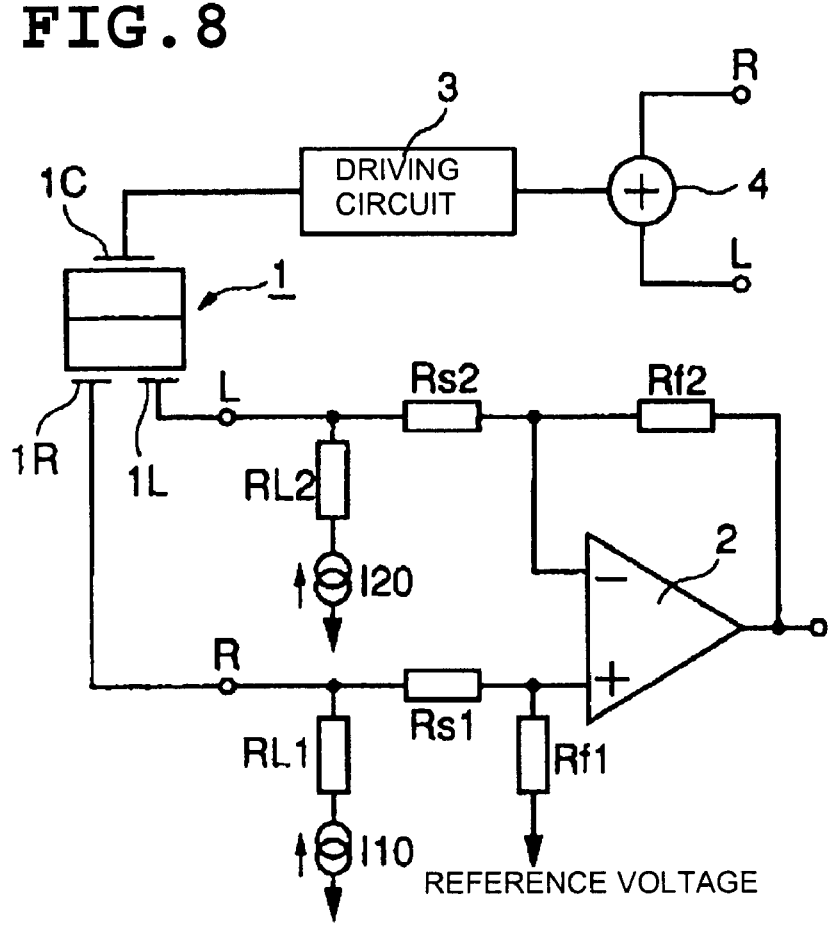
FIG.9A
PRIOR ART
FIG.9B
PRIOR ART
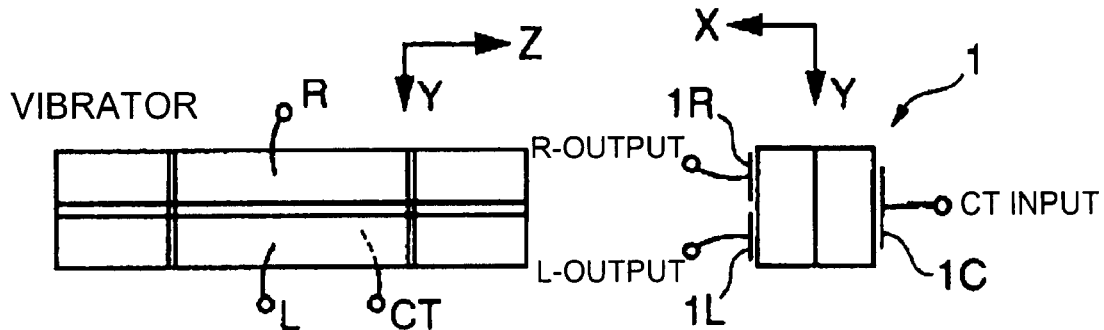

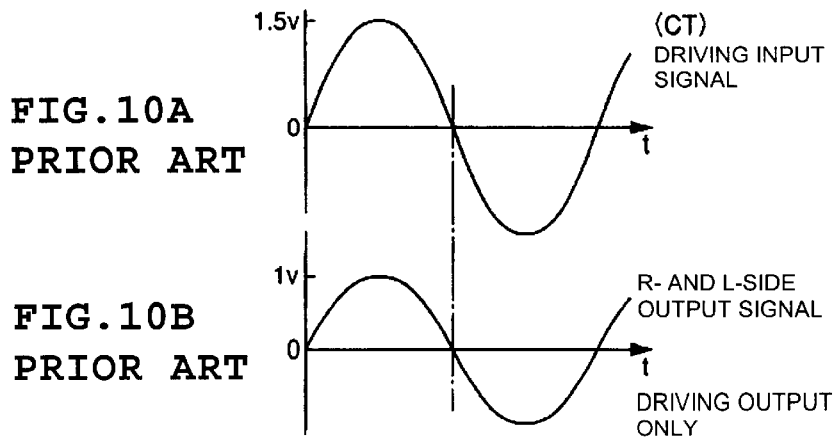
FIG.10A PRIOR ART — (CT) DRIVING INPUT SIGNAL
FIG.10B PRIOR ART — R- AND L-SIDE OUTPUT SIGNAL / DRIVING OUTPUT ONLY
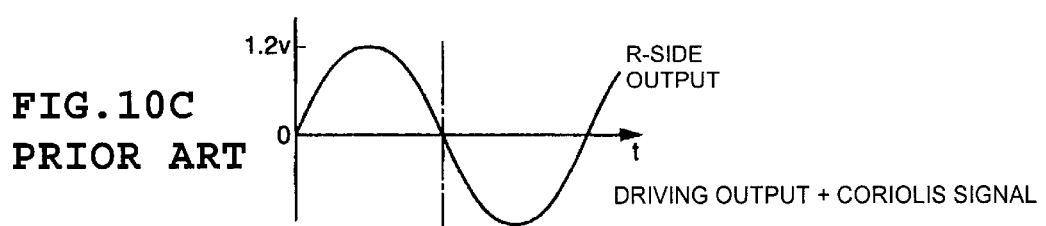
FIG.10C PRIOR ART — R-SIDE OUTPUT / DRIVING OUTPUT + CORIOLIS SIGNAL
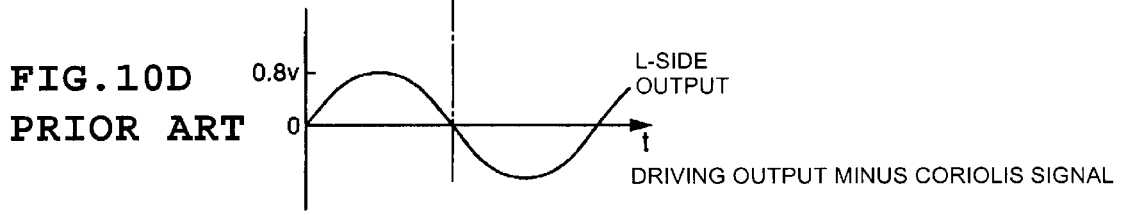
FIG.10D PRIOR ART — L-SIDE OUTPUT / DRIVING OUTPUT MINUS CORIOLIS SIGNAL

SELF-DIAGNOSING CIRCUIT FOR VIBRATING GYROSCOPE

BACKGROUND OF THE INVENTION

1. Field of the Invention

The present invention relates to a self-diagnosing circuit for a vibrating gyroscope and, more specifically, relates to a self-diagnosing circuit such as that capable of diagnosing a short-circuit failure of a vibrating gyroscope for a vehicle-mounted electrical device to be used in the control of vehicle position requiring high reliability.

2. Description of the Related Art

FIGS. 9A and 9B respectively show a plan view and a side view of an example of a bimorph vibrator to be used in a vibrating gyroscope. In FIGS. 9A and 9B, a bimorph vibrator 1 is formed by two piezoelectric elements having opposite polarization directions attached to each other such that the resulting bimorph vibrator 1 is rectangular in cross-section. If the vibrator 1 vibrates in a flexure vibration mode in a surface-normal direction (the X-axis direction), and is rotated with a certain angular velocity ($\Omega$) about the longitudinal axis direction (the Z-axis direction), a vibration occurs in the flexure vibration mode in a direction normal to the driving surface (the Y-axis direction) by the Coriolis force.

Since the amplitude of the vibration is proportional to the angular velocity, this is utilized in detecting an angular velocity value. The vibrator 1 is provided with detecting electrodes 1L and 1R of the left and the right thereof and a full-surface electrode 1C, and from the detecting electrodes 1L and 1R of the left and the right of the vibrator 1, signals L-side output and R-side output are outputted.

FIGS. 10A to 10D shows vibration waveforms of the bimorph vibrator shown in FIG. 9, and specifically, FIGS. 10A and 10B show waveforms when an angular velocity is not applied, for example, a case in which a driving output of 1 V is obtained for a vibration input of 1.5 V. FIGS. 10C and 10D show waveforms when the angular velocity is applied, for example, a case in which a Coriolis signal of 2 V is generated.

In the vibrator 1, if the driving signal CT shown in FIG. 10A is applied to the full surface electrode 1C, the R-side output and L-side output become sine waves of the same phase, as shown in FIG. 10B. At this time, the vibrator 1 is vibrating in a bending mode in the X-axis direction. However, since the angular velocity about the Z-axis is not applied, the Coriolis force is not generated, and a vibration in the bending mode in the Y-axis direction is not generated. The L-side output and R-side output of the vibrator are generated to vibrate the vibrator 1 in the X-axis direction and, as a result, the same signals are outputted from the R and L outputs.

Then, if an angular velocity $\Omega$ is applied about the Z-axis of the vibrator 1, a force in the $-Y$ direction proportional to the angular velocity $\Omega$ and a velocity $v_x$ in the X-axis is generated. This force is the Coriolis force. By the Coriolis force, the vibrator 1 is bent toward the Y-axis direction, and a bending vibration in the $-Y$ axis direction of the same frequency as the bending vibration in the X-axis direction is generated. Then, in accordance with the bending vibration in the Y-axis direction, Coriolis signals of opposing phases are generated at the R-side and L-side outputs. The Coriolis signals are proportional to the angular velocity, and FIGS. 10C and 10D shows a case where a DC angular velocity of a fixed magnitude is applied.

In order to extract a Coriolis signal component from the R-side output and L-side output of the vibrator 1, driving output components of the same phase included in the R-output and L-output are removed by a differential amplifier. By this, the Coriolis signals obtained in the R-output and L-output in opposite phases are outputted two-fold, unlike the driving output signals. Further, if the R-output and L-output are summed, the Coriolis signals included in the R-output and L-output in opposing phases mutually cancel out, and the driving output signals are outputted two-fold. The output can be used in self-exciting oscillation.

When a dynamic angular velocity (having an AC component) is applied about the Z-axis, a Coriolis signal is generated which has the same AC component as the angular velocity. The Coriolis signal that occurs at the output of the differential amplifier is a sine wave having the bending mode oscillating frequency in the X-axis direction and which is AM-modulated by the AC component of the angular velocity. FIG. 11A shows an applied angular velocity, and FIG. 11B shows that the sine wave of the oscillating frequency occurring in the differential output becomes an AM-modulated waveform.

Because the vehicle-mounted vibrating gyroscope is related to the basic functional control of the vehicle, a failure detecting function or self-diagnosing function is essential. As a means for detecting failure, a structure for monitoring the amplitude or frequency of a vibrator oscillating loop or a structure for monitoring the output amplitude of a differential amplifier in a detecting circuit is employed.

Specifically, for example, Japanese Unexamined patent publication No. 4-215017 discloses a circuit means for simultaneously monitoring an oscillating signal amplitude and a detecting signal (output of the detecting circuit differential amplifier) of a tuning-bar type gyroscope by use of a rectifier circuit, and for detecting a cease of the oscillation or disconnection of a detecting circuit signal wire.

Furthermore, Japanese Unexamined Patent Publication No. 5-264279 discloses a structure for detecting disconnection by monitoring the output amplitude of a detecting circuit differential amplifier, and Japanese Unexamined Patent Publication No. 6-18270 discloses structure for detecting a failure of an oscillating circuit by monitoring a resonant frequency of an oscillating circuit signal.

In such conventional examples, there are described structures of detecting circuits based on technical knowledge intrinsic to the vibrating gyroscope, such as the fact that amplitudes or frequencies of the oscillating loop signals in the normal operation of the gyroscope are constant, or an output amplitude of a detecting circuit is not larger than a fixed value under normal operation.

However, failure modes detectable in the conventional example are only the cessation of oscillation of the gyroscope and the disconnection of a detecting circuit unit to detect short-circuiting of the detecting circuit unit due to, for example, a migration phenomenon of a circuit wiring pattern material inside the gyroscope or the electrode material of the gyroscopic vibrator which can occur in a high temperature and high humidity environment.

SUMMARY OF THE INVENTION

Accordingly, a main object of the present invention is to provide a self-diagnosing circuit for a vibrating gyroscope which has the advantage of failure detection for short-circuiting of the detecting circuit portion.

The self-diagnosing circuit for the vibrating gyroscope for detecting a vibration due to a Coriolis force generated in the Y-axis direction when a vibrator is excited in the X-axis direction and rotated about the Z-axis direction, comprises: differential operating means for calculating a difference between output signals outputted from a plurality of detecting means which is provided on the vibrator to detect the vibration due to a Coriolis force; and an offset signal source for superposing an offset signal on at least one of the signals outputted from said plurality of detecting means such that the signals are offset with different signal levels.

The self-diagnosing circuit for a vibrating gyroscope may further comprises signal detecting means for detecting the presence or absence of a signal component caused by an offset signal included in an output signal of said difference operating means. In addition, means for detecting a failure based on an output voltage and the phase thereof of said difference operating means may be included in the self-diagnosing circuit.

The offset signal source may include either a voltage signal source for outputting an offset voltage as an offset signal or a current signal source for outputting an offset current as an offset signal.

As described above, according to the present invention, by superposing an offset signal on at least one of the signals outputted after detecting a vibration due to the Coriolis force of a vibrator, and by detecting the presence or absence of a signal component caused by the offset signal included in the outputted signals ofthe difference operating means for calculating the difference of the detecting outputs, it becomes possible to detect short-circuiting between detecting electrodes, or short-circuiting between a detecting electrode and a grounded potential, or a source voltage and a circuit reference potential, which has been difficult to detect so far. Thus, a vibrating gyroscope having higher self-diagnosing ability and reliability than previously can be realized.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWINGS

FIG. 8 is a circuit diagram of a self-diagnosing circuit showing a fifth embodiment of the present invention.

FIGS. 9A and 9B are outside views of an example of a bimorph vibrator to be used in a vibrating gyroscope.

FIGS. 10A to 10D are diagrams showing vibration waveforms of the bimorph vibrator shown in FIG. 9.

DETAILED DESCRIPTION OF PREFERRED EMBODIMENTS

Hereinafter, the preferred embodiments of the present invention are explained in detail with reference to the drawings.

Figure 1:
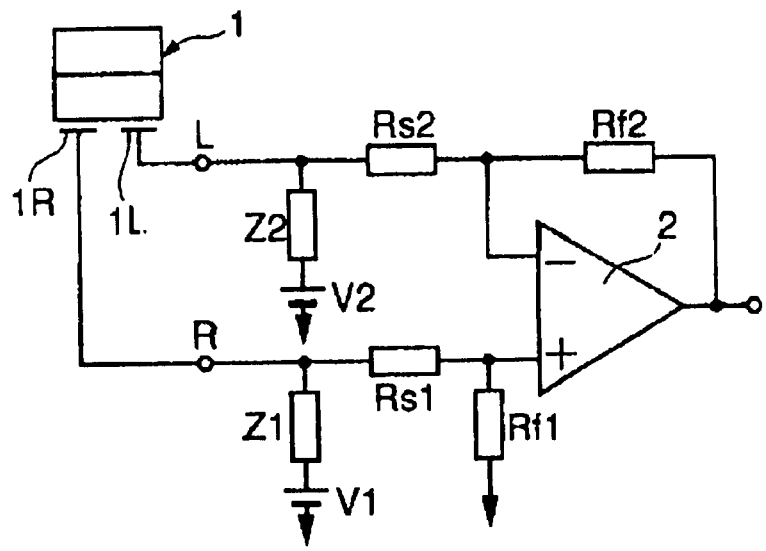
FIG. 1 is a circuit diagram of a self-diagnosing circuit of a first embodiment of the present invention.

FIG. 1 shows a circuit diagram of a self-diagnosing circuit of a first embodiment of the present invention. In FIG. 1, a vibrator 1 is provided with a left side detecting electrode 1L and a right side detecting electrode 1R which serve as a plurality of detecting means, and from these detecting electrodes 1L and 1R, left and right detecting signals are outputted to be applied to negative (−) and positive (+) inputs of a differential amplifier 2 via resistors Rs1 and Rs2. A reference voltage Vref is applied to the positive input of the differential amplifier 2 via a resistor Rf1, and a resistor Rf2 is connected between the negative input and the output. It is to be noted that the resistors Rs1 and Rs2 have the same resistance Rs in this embodiment and in the embodiment explained hereinafter. Also the resistor Rf1 and Rf2 have the same resistance Rf.

Furthermore, offset voltages V1 and V2 are applied to the electrode 1R and the electrode 1L for simultaneous reference via impedances Z1 and Z2. The offset voltage V1 is different from the offset voltage V2 while the impedances Z1 and Z2 have the same impedance.

In normal operation, the DC offset voltages of V1−V2 is outputted at the output of the differential amplifier 2. Upon occurrence of a failure such as when the left and the right detecting electrodes 1L and 1R are short-circuited, the DC offset voltage V1−V2 becomes zero, since the same offset voltages are applied to the electrode 1L and the electrode 1R. As a result, the output ofthe differential amplifier 2 includes no DC offset voltages. By detecting this presence or absence of the DC offset voltage, it is possible to determine the presence or absence of short-circuiting of the left side detecting electrode 1L and the right side detecting electrode 1R.

It is to be noted that in the self-diagnosing circuit shown in FIG. 1, the offset voltages V1 and V2 are applied to the electrode 1R and the electrode 1L, but either the offset voltage V1 or the offset voltage V2 may be omitted. In the case, the omitted offset voltage is presumed to apply a zero voltage. That is, it is required to apply at least one offset voltage to at least one of the electrode 1L and the electrode 1R so that the detected signals from the electrode 1L and the electrode 1R are biased or offset with a different voltage. This is also true for the following embodiments explained hereinafter.

Figure 2:
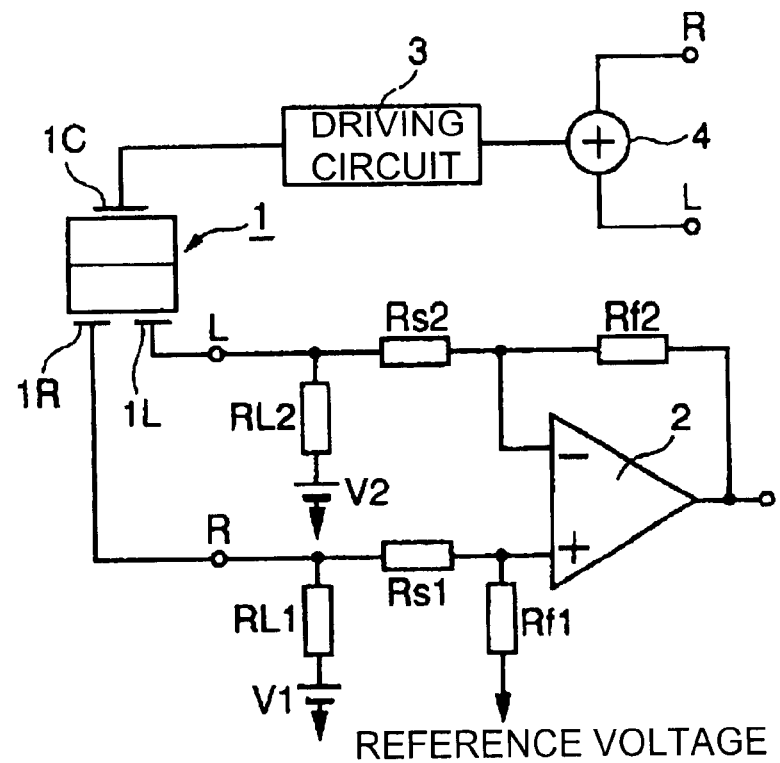
FIG. 2 is a circuit diagram of a self-diagnosing circuit of a second embodiment of the present invention.

FIG. 2 is a circuit diagram of a self-diagnosing circuit of a second embodiment of the present invention. In FIG. 2, a vibrator 1 is provided with a full surface electrode 1C for applying a driving signal for self-exciting the vibrator 1. The driving signal is applied from a driving circuit 3 to the full surface electrode 1C. The driving circuit 3 comprises an AGC circuit in which respective detecting signals generated in two detecting electrodes 1L and 1R are added in an adding circuit 4 to make a sum signal which is made to be constant, and a phase shifting circuit for providing an optimal phase state for the self-exciting oscillating loop to continue.

If the vibrator 1 is driven in self-oscillation by the driving circuit 3, based on a detecting signal generated at the two detecting electrodes 1L and 1R when an angular velocity is applied to the vibrator, an angular velocity signal is obtained from the differential amplifier 2. The output of the differential amplifier 2 is smoothed and DC amplified through a wave detection circuit (not shown) in synchronism with the driving signal of the driving circuit 3, and finally outputted as a DC voltage signal in accordance with the magnitude of the angular velocity.

Here, the signals generated at the detecting electrodes 1L and 1R are two kinds, namely, an AC signal caused by a driving mode vibration excited by the driving signal, and an AC signal caused by a detecting mode vibration excited by the Coriolis force generated at the vibrator 1 by an applied angular velocity. The signals are each an AC signal of the same resonant frequency as the vibrator 1. Further, the detecting electrodes 1R and 1L of the vibrator 1 function as a capacitor composed of a piezoelectric unit if viewed from the circuit side. The AC signals generated by the driving mode and the detecting mode can be regarded as an AC current source connected in parallel with the capacitor.

In the vibrator 1, the amplitudes and phases of AC signals generated at the respective detecting electrodes 1L and 1R by the driving mode coincide with each other, and when there is no offset signal in a state in which an angular velocity is not applied, the output of the differential amplifier 2 is equal to the reference voltage Vref.

When the gyroscope is normally operated in this way, the output of the differential amplifier 2 is superposed on DC signals caused by the offset voltages V1 and V2 via the resistor RL1 and RL2 having the same resistance, respectively, in addition to the AC signal caused by the above-described driving mode vibration or the detecting mode vibration. The magnitude $V_0$ of the DC output of the differential amplifier 2 is given by the following expression, provided that the differential amplifier 2 is an ideal amplifier.

$$V_0=(V1-V2)\times(Rf/(Rs+RL))$$

where the resistance of the resistor RL1 and RL2 is RL.

Now a case is considered in which the detecting electrodes 1L and 1R are short-circuited for some reason. In this case, potentials of the short-circuited detecting electrodes 1L and 1R have the same value irrespective of the values of the offset potentials V1 and V2 and, as a result, the DC signal $V_0$ of the output of the differential amplifier 2 is canceled out to be zero (0).

Furthermore, when either of the detecting electrode 1L or the detecting electrode 1R is short-circuited, for example, with the reference voltage potential Vref, a DC voltage, in accordance with the offset potential of the detecting electrode which is not short-circuited, is outputted a the DC voltage Vo. For example, if the detecting electrode 1R side of the right side is short-circuited with the reference voltage potential Vref, the DC voltage $V_0$ takes the value of the reference voltage Vref given by the following expression.

$$V_0=-V2\times(Rf/(Rs+RL))$$

Accordingly, the DC voltage $V_0$ of the differential amplifier 2 can take values which corresponded to states of the detecting electrode, and the DC voltage $V_0$ can be monitored to determine the states of the detecting electrode. Such embodiments are shown in FIG. 3 and FIG. 4.

Figure 3:
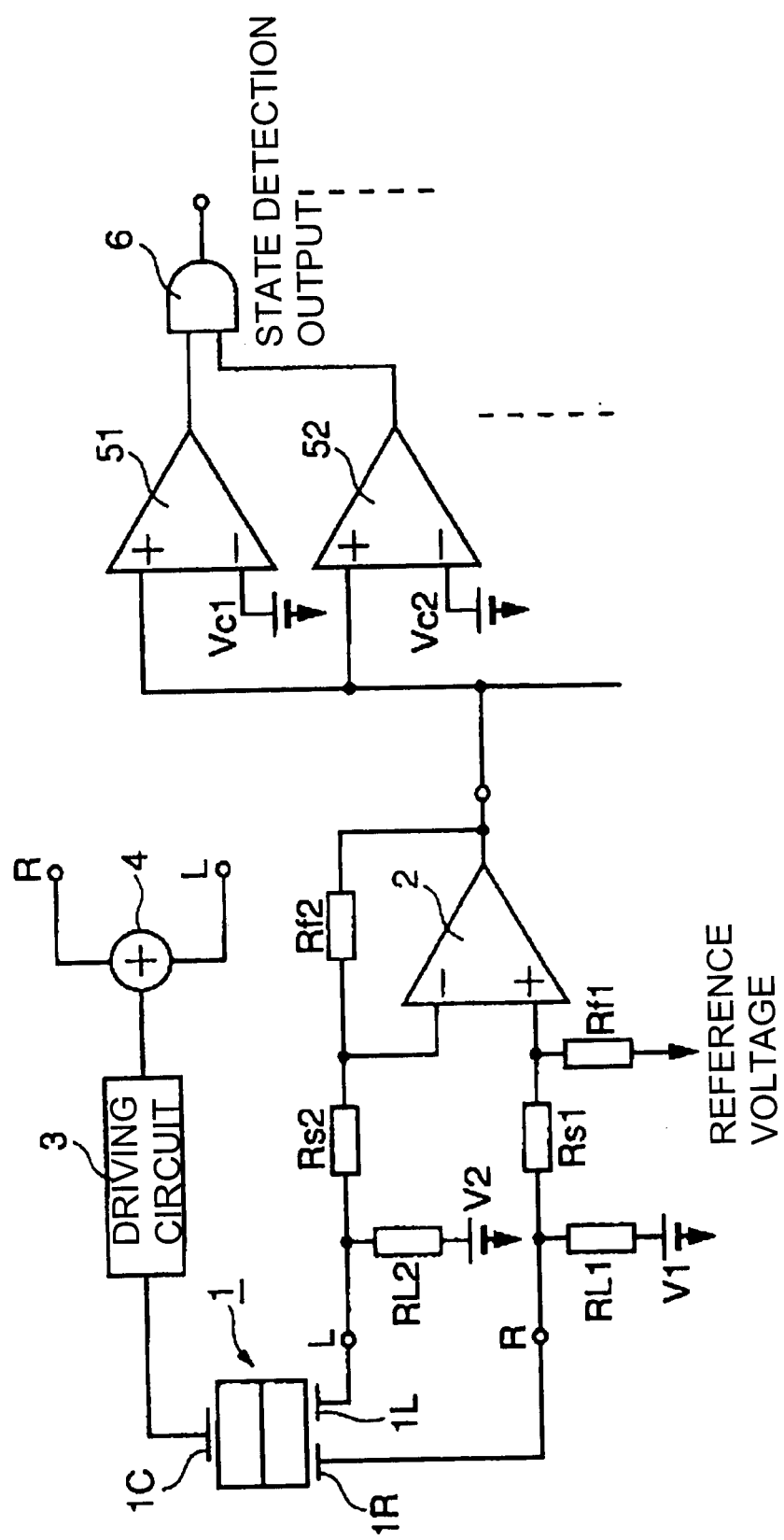
FIG. 3 is a diagram showing an embodiment for determining a state of a detecting electrode by use of a window comparator.

FIG. 3 is a diagram of an embodiment for determining a state of a detecting electrode by use of a window comparator. In FIG. 3, the output of the differential amplifier 2 is connected with the plus inputs of a plurality of window comparators 51, 52. Reference voltages Vc1, Vc2, of respectively different potentials are applied to the negative inputs of window comparators 51, 52, respectively. The reference potentials Vc1, Vc2 are, as described in the embodiment of FIG. 2, capable of detecting a plurality of causes by keeping the DC current outputted from the differential amplifier 2 set at a potential which can be discriminated when the detecting electrodes 1L and 1R are short-circuited, or by keeping the DC current outputted from the differential amplifier set at a potential which can be discriminated when either of the detecting electrodes 1L or 1R are short-circuited with, for example, the reference voltage potential Vref. The outputs of the respective window comparators 51, 52 are applied to a logical AND gate 6 to obtain a state detection output.

Figure 4:
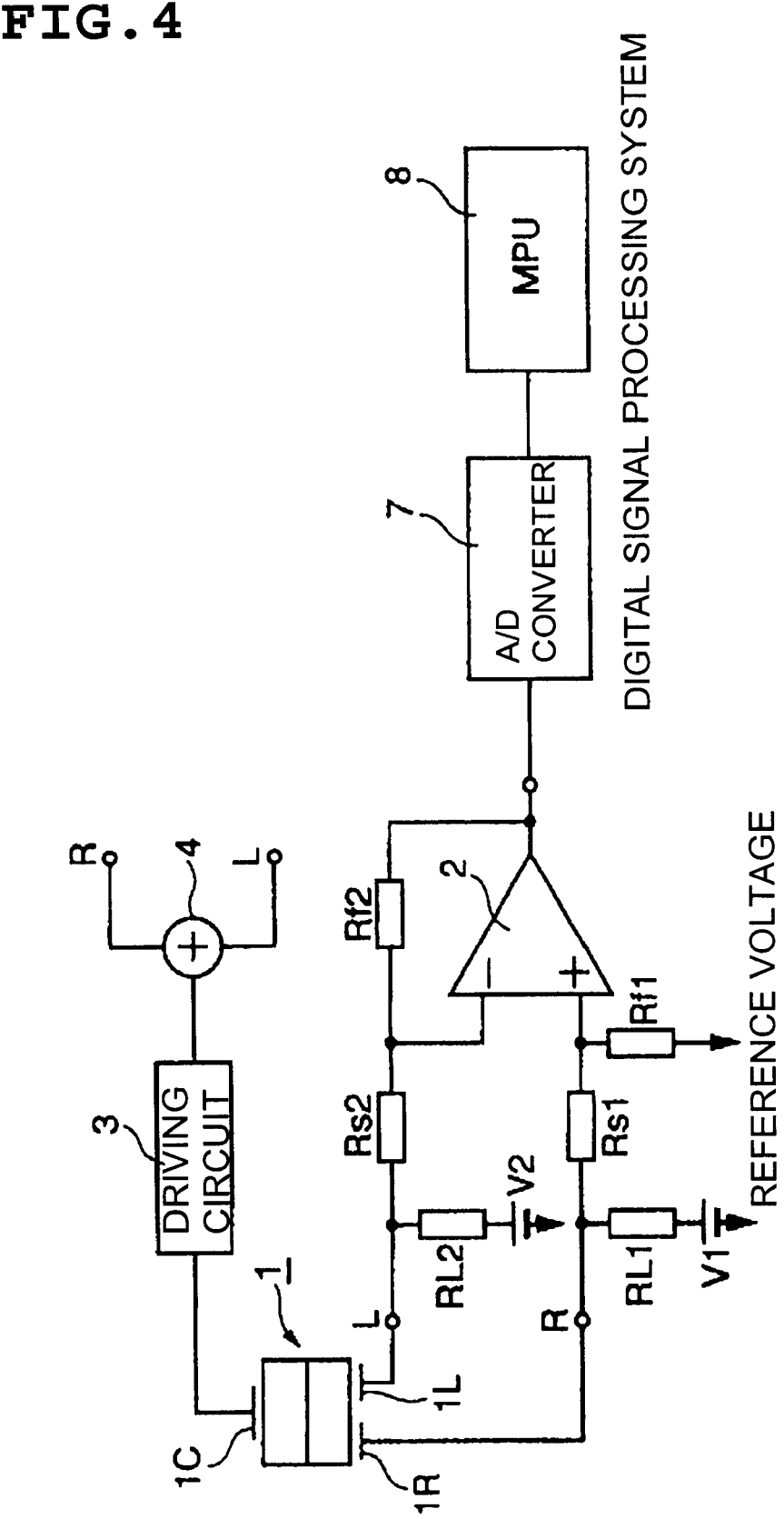
FIG. 4 is a diagram showing an embodiment for digitally determining a state of a detecting electrode.

FIG. 4 is a circuit diagram showing an embodiment for digitally determining a state of a detecting electrode. In FIG. 4, a DC voltage of the output of the differential amplifier 2 is applied to an A/D converter 7, and converted into a digital signal to be applied to an MPU 8. The MPU 8 discriminates the DC current converted into a digital signal, and discriminates the plurality of causes described in FIG. 3.

Figure 5:
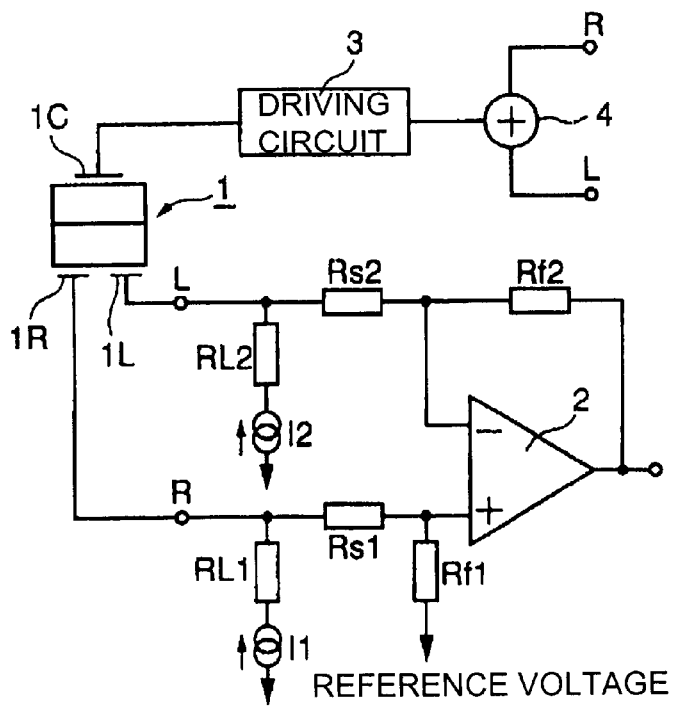
FIG. 5 is a circuit diagram of a self-diagnosing circuit of a third embodiment of the present invention.

FIG. 5 is a circuit diagram showing a third embodiment of the present invention. A self-diagnosing circuit shown in FIG. 5 is made to use offset current sources I1 and I2 in place of the offset voltage V1, and V2 shown in FIG. 2, and the other structure is the same as that of FIG. 2. In this case, the offset current generates the offset voltages I1×RL and I2×RL respectively at the detecting electrodes 1L and 1R via load resistors RL and RL2, respectively.

Similarly with the case of the embodiment of FIG. 2, when the detecting electrodes 1L and 1R are in the normal state, the output voltage $V_0$ of the differential amplifier 2 outputs the value of the following expression with the reference voltage Vref as the reference.

$$V_0=(I1-I2)\times Rf$$

where the resistance of the resistor Rf1 and Rf2 is Rf.

From this, for example, when the detecting electrodes 1L and 1R are short-circuited, the following expression is obtained for the output voltage $V_0$ of the differential amplifier 2, provided that the reference voltage is Vref, namely:

$$V_0=Vref$$

Furthermore, when the detecting electrode 1R is short-circuited with the reference voltage Vref, the output $V_0$ of the differential amplifier 2 is expressed, with the reference voltage Vref as the reference, as follows, namely:

$$V_0=-I2\times Rf$$

Accordingly, similarly with the case in FIG. 2, the state of the detecting electrode can be monitored.

Figure 6:
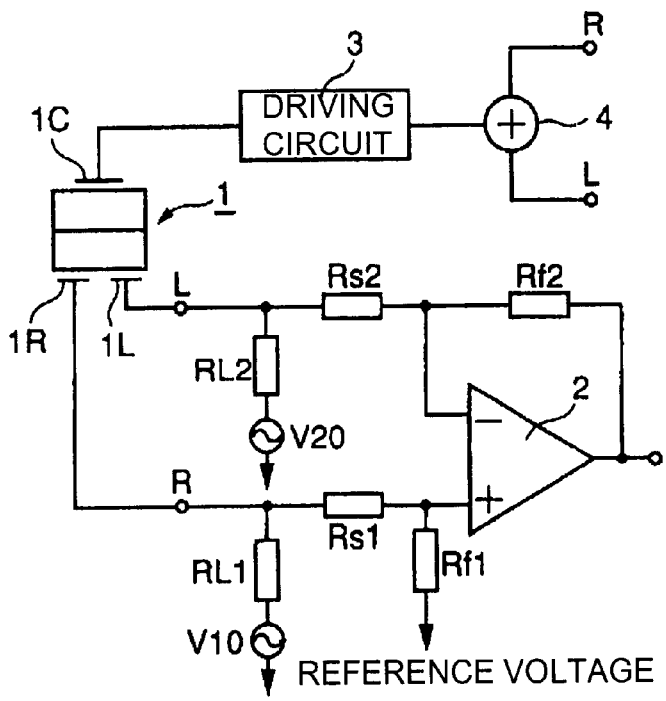
FIG. 6 is a circuit diagram showing a self-diagnosing circuit of a fourth embodiment of the present invention.

FIG. 6 is a circuit diagram showing a fourth embodiment of the present invention. This embodiment is a modification of the embodiment shown in FIG. 2 in which the DC offset voltages V1 and V2 are replaced with AC offset voltages V10 and V20. However, in this embodiment, since an AC signal occurs at the output of the differential amplifier 2, a detecting method-different from that in FIG. 2 is required. In other words, specifically, a monitor circuit to be connected with the output of the differential amplifier 2 is composed of a wave detection circuit in synchronism with the respective offset voltages V10 and V20.

If the offset voltages V10 and V20 are respectively made to be;

$$V10=Va\times\sin\omega 1t,\ V20=Vb\times\sin\omega 2t,$$

where Va and Vb are amplitudes of V10 and V20.

In normal operation, signals caused by the offset voltages V10 and V20 are outputted in a form in which the output $V_O$ of the differential amplifier 2 is superposed on AC signals caused by self-excitation and angular velocity detection of the vibrator 1. Accordingly, if a wave detection circuit to be driven in synchronism with the two offset signals is kept connected with the output of the differential amplifier 2, AC signals respectively caused by the offset voltages V10 and V20 can be detected in normal operation.

Figure 7:
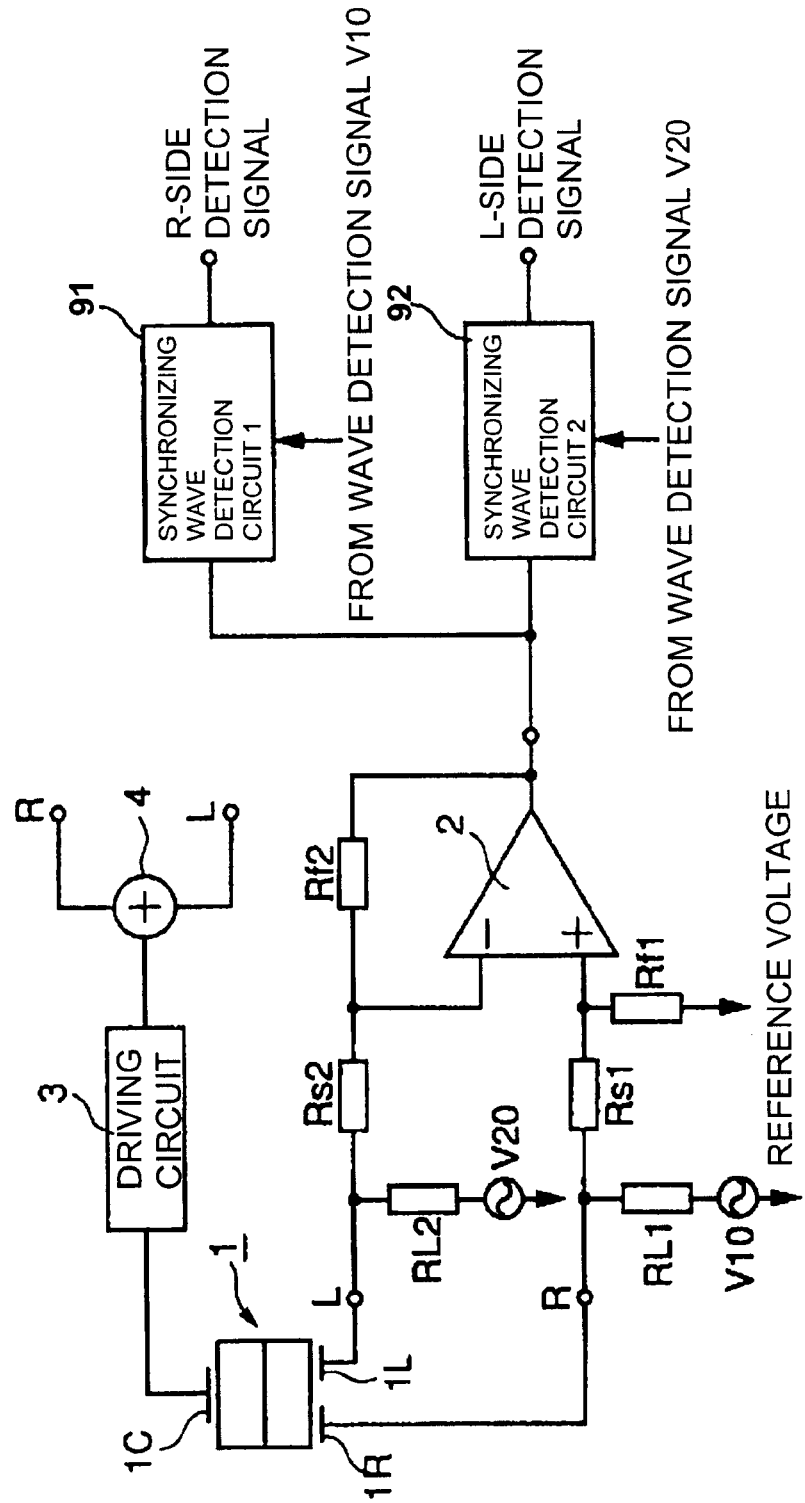
FIG. 7 is a diagram showing a wave detection circuit to be driven in synchronism with two offset signals as a monitoring circuit.
Figures 11A, 11B:
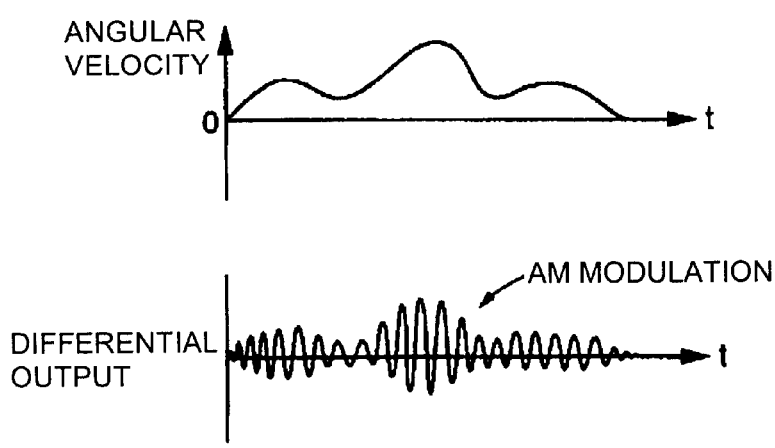
FIGS. 11A and 11B are waveform diagrams of Coriolis signals which occur in a differential output when a dynamic angular velocity having an AC component is applied.

FIG. 7 is a diagram showing a wave detection circuit to be driven in synchronism with two offset signals as a monitor circuit. In FIG. 7, the output of the differential amplifier 2 is connected with synchronizing wave detection circuits 91 and 92. A/C offset voltages V10 and V20 are respectively applied to the synchronizing wave detection circuits 91 and 92. The synchronizing wave detection circuits 91 and 92 synchronize with these offset voltages V10 and V20 to detect the output of the differential amplifier 2. In other words, in normal operation, A/C signals respectively caused by the offset voltages V10 and V20 are detected, and when the detecting electrode 1L or 1R is short-circuited with the reference voltage Vref or the like, the wave detecting output of respective offset signals becomes zero, thereby a short-circuit state can be detected.

However, in this embodiment, if the detecting electrodes 1L and 1R are shortcircuited, since a composite signal of respective offset voltages is outputted at the output of the differential amplifier 2, the short-circuiting cannot be detected. In order to detect the short-circuiting, a DC level monitor circuit for the wave detection signal is required to be provided at the stage after the synchronizing wave detection circuits 91 and 92.

FIG. 8 is a circuit diagram of a self-diagnosing circuit showing a fifth embodiment of the present invention. The embodiment shown in FIG. 8 is a modification of the embodiment as shown in FIG. 5 and the DC current sources I1 and I2 of the offset signal source are replaced with AC current sources I10 and I20. In the case of this embodiment, similarly to the embodiment shown in FIG. 6, a signal including frequency components of the two AC signal sources I10 and I20 is outputted at the output of the differential amplifier 2. Accordingly, by providing synchronizing wave detection circuits 91 and 92 for respective frequencies, as shown in FIG. 7, detection of the states of the detecting electrodes 1L and 1R is made possible.

For reference, in the above-described embodiment, although a case is described in which the present invention is applied to a bimorph-type piezoelectric vibrator, the present invention is not limited thereto and can be applied to any piezoelectric vibrating gyroscope in which L/R signals are outputted and the reference signal, the excitation voltage, and the sum voltage occur, such as a vibrator with a piezoelectric element attached to a rectangular column or triangular column made of a metal, a vibrator using a cylinder-type piezoelectric element, and further a tuning-fork type vibrator or the like.

Furthermore, the present invention can be applied even to a magnetic vibrating gyroscope or an optical vibrating gyroscope.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A self-diagnosing circuit for a vibrating gyroscope having a vibrator for detecting a vibration due to a Coriolis force, comprising:

differential operating means for determining a difference between output signals outputted from a plurality of detecting means which are provided on the vibrator to detect the vibration due to the Coriolis force; and an offset signal source for superposing an offset signal on at least a first one of the signals outputted from said plurality of detecting means such that the signals are offset with different signal levels; further comprising signal detection means for detecting the presence or absence of a signal component caused by an offset signal included in an output signal of said differential operating means; and based on the presence or absence of said signal component, determines a state of a detecting means on the vibrator.

2. A self-diagnosing circuit for a vibrating gyroscope according to claim 1, further comprising:

an additional offset signal source for superposing an offset signal on a second one of the signal outputted from said plurality of detecting means such that the signals are offset with different signal levels.

3. A self-diagnosing circuit for a vibrating gyroscope as claimed in claim 2, wherein the offset signal source and the additional signal source are each voltage signal sources.

4. A self-diagnosing circuit for a vibrating gyroscope as claimed in claim 3, wherein the offset voltage signal source and the additional offset voltage signal source are each DC voltage signal sources.

5. A self-diagnosing circuit for a vibrating gyroscope as claimed in claim 3, wherein the offset voltage signal source and the additional offset voltage signal source are each AC voltage signal sources.

6. A self-diagnosing circuit for a vibrating gyroscope as claimed in claim 2, wherein the offset signal source and the additional offset signal source are each current signal sources.

7. A self-diagnosing circuit for a vibrating gyroscope as claimed in claim 6, wherein the offset current signal source and the additional offset current signal source are each DC current signal sources.

8. A self-diagnosing circuit for a vibrating gyroscope as claimed in claim 6, wherein the offset current signal source and the additional offset current signal source are each AC current signal sources.

9. A self-diagnosing circuit for a vibrating gyroscope as claimed in claim 2, wherein the offset signal source and the additional signal source have different values.

10. A self-diagnosing circuit for a vibrating gyroscope as claimed in claim 1 or claim 2, further comprising signal detecting means for detecting the presence or absence of a signal component caused by an offset signal included in an output signal of said difference operating means.

11. A self-diagnosing circuit for a vibrating gyroscope as claimed in claim 1, wherein said signal detecting means includes an analog-to-digital converter responsive to the output signal of said differential operating means to convert said signal into a digital signal.

12. A self-diagnosing circuit for a vibrating gyroscope as claimed in claim 11, further including a processing unit responsive to the output of said analog-to-digital converter for detecting the presence or absence of the signal component caused by an offset signal included in an output signal of said differential operating means.

13. A self-diagnosing circuit for a vibrating gyroscope as claimed in claim 1, wherein the signal detecting means includes a wave detection circuit operated in synchronism with the offset and additional offset signal sources.

14. A self-diagnosing circuit for a vibrating gyroscope as claimed in claim 1, wherein said offset signal source includes a voltage signal source for outputting an offset voltage as an offset signal.

15. A self-diagnosing circuit for a vibrating gyroscope as claimed in claim 14, wherein the voltage signal source is a DC signal source.

16. A self-diagnosing circuit for a vibrating gyroscope as claimed in claim 14, wherein the voltage signal source is an AC signal source.

17. A self-diagnosing circuit for a vibrating gyroscope as claimed in claim 1, wherein said offset signal source includes a current signal source for outputting an offset current as an offset signal.

18. A self-diagnosing circuit for a vibrating gyroscope as claimed in claim 17, wherein the current signal source is a DC current signal source.

19. A self-diagnosing circuit for a vibrating gyroscope as claimed in claim 18, wherein said current signal source is an AC current signal source.

20. A self-diagnosing circuit for a vibrating gyroscope as claimed in claim 1 or claim 2, further including means for detecting a failure based on an output voltage and the phase thereof of said differential operating means.

21. A self-diagnosing circuit for a vibrating gyroscope having a vibrator for detecting a vibration due to a Coriolis force, comprising:

a differential operating circuit for determining a difference between output signals outputted from a plurality of detecting electrodes which are provided on the vibrator to detect the vibration due to the Coriolis force; and an offset signal source for superposing an offset signal on at least a first one of the signals outputted from said plurality of detecting electrodes such that the signals are offset with different signal levels; further comprising a signal detector detecting the presence or absence of a signal component caused by an offset signal included in an output signal of said differential operating circuit, and based of the presence or absence of said signal component, determines a state of detecting electrode on the vibrator.

* * * * *